(12) United States Patent
Jie

(10) Patent No.: US 11,900,676 B2
(45) Date of Patent: Feb. 13, 2024

(54) METHOD AND APPARATUS FOR DETECTING TARGET IN VIDEO, COMPUTING DEVICE, AND STORAGE MEDIUM

(71) Applicant: TENCENT TECHNOLOGY (SHENZHEN) COMPANY LIMITED, Shenzhen (CN)

(72) Inventor: Zequn Jie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 274 days.

(21) Appl. No.: 17/374,971

(22) Filed: Jul. 13, 2021

(65) Prior Publication Data

US 2021/0342593 A1  Nov. 4, 2021

Related U.S. Application Data

(63) Continuation of application No. PCT/CN2020/088636, filed on May 6, 2020.

(30) Foreign Application Priority Data

May 21, 2019  (CN) .......................... 201910424359.4

(51) Int. Cl.
*G06V 20/40* (2022.01)
*G06T 7/246* (2017.01)
(Continued)

(52) U.S. Cl.
CPC ............ *G06V 20/41* (2022.01); *G06F 18/214* (2023.01); *G06T 7/246* (2017.01); *G06V 10/255* (2022.01);
(Continued)

(58) Field of Classification Search
None
See application file for complete search history.

(56) References Cited

U.S. PATENT DOCUMENTS

2018/0232563 A1* 8/2018 Albadawi ............. A61B 5/1113
2019/0347806 A1* 11/2019 Vajapey .................... G06T 7/20
(Continued)

FOREIGN PATENT DOCUMENTS

CN  107944412 A  4/2018
CN  108280843 A  7/2018
(Continued)

OTHER PUBLICATIONS

Translation of CN108875480, an IDS document (Year: 2018).*
(Continued)

*Primary Examiner* — Vikkram Bali
(74) *Attorney, Agent, or Firm* — ANOVA LAW GROUP, PLLC

(57) ABSTRACT

This application discloses a method for detecting a target in a video, performed by a computing device. The method includes applying a target detection operation to a first frame in the video, to determine a first target detection result of the target in the first frame; applying a target tracking operation to a second frame after the first frame in the video, to determine changes of the target between the first frame and the second frame; and determining a second target detection result of the target in the second frame according to the first target detection result and the changes of the target between the first frame and the second frame.

19 Claims, 5 Drawing Sheets

(51) Int. Cl.
  *G06F 18/214* (2023.01)
  *G06V 10/82* (2022.01)
  *G06V 10/44* (2022.01)
  *G06V 10/20* (2022.01)

(52) U.S. Cl.
  CPC ............ *G06V 10/454* (2022.01); *G06V 10/82* (2022.01); *G06T 2207/10016* (2013.01); *G06T 2207/20084* (2013.01); *G06T 2207/30232* (2013.01); *G06V 2201/07* (2022.01)

(56) References Cited

U.S. PATENT DOCUMENTS

2020/0159244 A1* 5/2020 Chen ..................... G01S 13/865
2020/0334830 A1  10/2020 Wang et al.

FOREIGN PATENT DOCUMENTS

| CN | 108875480 A | 11/2018 |
| CN | 108875588 A | 11/2018 |
| CN | 108898086 A | 11/2018 |
| CN | 109086648 A | 12/2018 |
| CN | 109636829 A | 4/2019 |
| CN | 110176024 A | 8/2019 |

OTHER PUBLICATIONS

Translation of CN109636829, an IDS document (Year: 2019).*
The World Intellectual Property Organization (WIPO) International Search Report for PCT/CN2020/088636 dated Aug. 5, 2020 8 Pages (including translation).

* cited by examiner (t−1)$^{th}$ frame  t$^{th}$ frame   First neural network   Output map   Target tracking result

METHOD AND APPARATUS FOR DETECTING TARGET IN VIDEO, COMPUTING DEVICE, AND STORAGE MEDIUM

RELATED APPLICATIONS

This application is a continuation application of PCT Application No. PCT/CN2020/088636, entitled "METHOD AND APPARATUS FOR DETECTING TARGET IN VIDEO, AND COMPUTING DEVICE AND STORAGE MEDIUM" and filed on May 6, 2020, which claims priority to Chinese Patent Application No. 201910424359.4, entitled "METHOD AND APPARATUS FOR DETECTING TARGET IN VIDEO, DEVICE, AND STORAGE MEDIUM" filed with the China National Intellectual Property Administration on May 21, 2019. The two applications are both incorporated herein by reference in their entirety.

FIELD OF THE TECHNOLOGY

This application relates to the field of image processing, and specifically, to a method and apparatus for detecting a target in a video, a vehicle, a robot, a monitoring device, a computing device, and a storage medium.

BACKGROUND OF THE DISCLOSURE

Content analysis or target object detection may be implemented by performing target detection on an online video. For example, target detection and positioning of an unmanned vehicle, target detection of a robot, target detection of a live video, or target detection of security surveillance.

Frame-by-frame image target detection may be used or optical flow information between every two frames may be extracted to perform target detection on each frame of a video. Because existing target detection algorithms are relatively time-consuming, it is desirable to provide a faster target detection method.

SUMMARY

An objective of this application is to provide a method and apparatus for detecting a target in a video, a vehicle, a robot, a monitoring device, a computing device, and a storage medium.

One aspect of this application discloses a method for detecting a target in a video, performed by a computing device. The method includes applying a target detection operation to a first frame in the video, to determine a first target detection result of the target in the first frame; applying a target tracking operation to a second frame after the first frame in the video, to determine changes of the target between the first frame and the second frame; and determining a second target detection result of the target in the second frame according to the first target detection result and the changes of the target between the first frame and the second frame.

Another aspect of the present application provides an apparatus for detecting a target in a video. The apparatus includes a target detection unit, configured to apply a target detection operation to a first frame in the video, to determine a first target detection result of the target in the first frame; a target tracking unit, configured to apply a target tracking operation to a second frame after the first frame in the video, to determine changes of the target between the first frame and the second frame; and a result determining unit, configured to determine a second target detection result of the target in the second frame according to the first target detection result and the changes of the target between the first frame and the second frame.

According to still another aspect of this application, a computing device for detecting a target in a video is further provided. The device includes a memory and a processor, the memory storing instructions, and the instructions, when executed by the processor, causing the processor to perform: applying a target detection operation to a first frame in the video, to determine a first target detection result of the target in the first frame; applying a target tracking operation to a second frame after the first frame in the video, to determine changes of the target between the first frame and the second frame; and determining a second target detection result of the target in the second frame according to the first target detection result and the changes of the target between the first frame and the second frame.

Another aspect of this application provides a non-transitory computer-readable storage medium. The computer-readable storage medium storing instructions, the instructions, when executed by a processor, causing the processor to perform the foregoing method.

In the method and apparatus for detecting a target in a video, the vehicle, the robot, the monitoring device, the computing device, and the storage medium provided in this application, by applying a target tracking operation on a second frame after a first frame. A target detection result of the second frame can be determined according to a target detection result of the first frame and by tracking a change of the target corresponding to the target detection result in the first frame, and the change is between the first frame and the second frame. By using the method provided in this application, a target detection operation can be performed on some image frames in a video to determine a target in the image frames, and a target tracking operation may be performed on other image frames in the video to determine a target in the other image frames. That is, by using the method provided in this application, a target detection algorithm can be performed on a video using a frame skip method. Because time consumed by the target tracking operation is less than time consumed by the target detection operation, the solution of this application can reduce the amount of calculation needed for target detection on a video, so that real-time performance of the target detection is better.

BRIEF DESCRIPTION OF THE DRAWINGS

To describe technical solutions of embodiments of this application more clearly, the following briefly describes accompanying drawings required for describing the embodiments. Apparently, the accompanying drawings in the following description show merely some embodiments of this application, and a person of ordinary skill in the art can still derive other drawings from these accompanying drawings without creative efforts. The following accompanying drawings are not deliberately drawn to scale according to the actual size, and a focus is demonstrating the main idea of this application.

DESCRIPTION OF EMBODIMENTS

Figure 1:
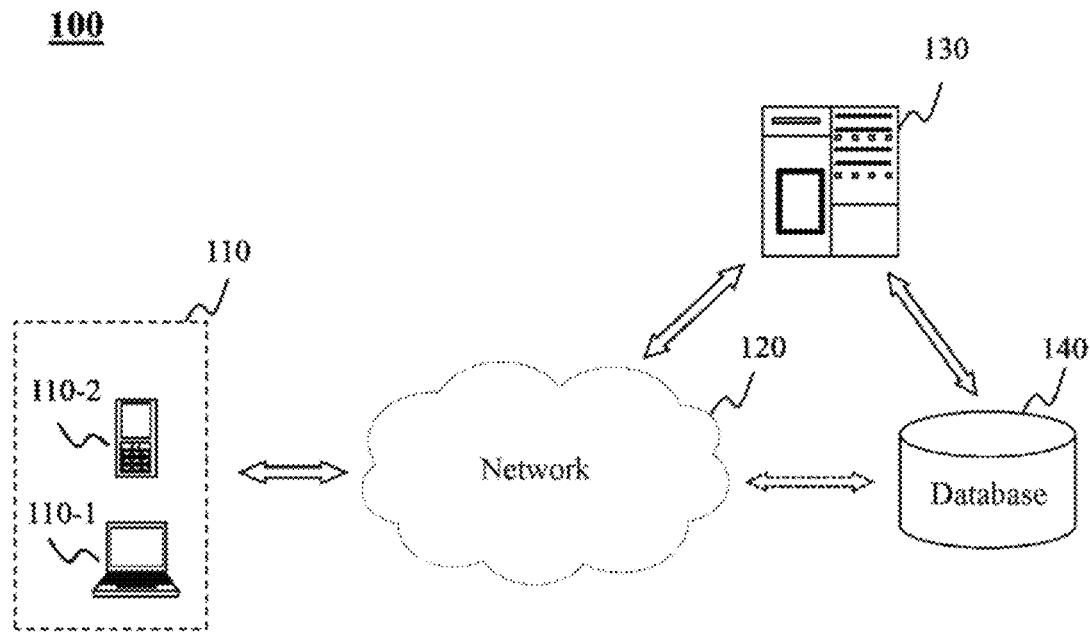
FIG. 1 is a diagram of an exemplary scenario of an image processing system according to an embodiment of this application.

To make the objectives, technical solutions, and advantages of the embodiments of this application more comprehensible, the following clearly and completely describes the technical solutions in the embodiments of this application with reference to the accompanying drawings in the embodiments of this application. Apparently, the described embodiments are a part rather than all of the embodiments of this application. All other embodiments obtained by a person of ordinary skill in the art based on the embodiments of this application without creative efforts shall fall within the protection scope of this application.

Unless otherwise defined, a technical term or a scientific term used in this application is to have a general meaning understood by a person of ordinary skill in the art of this application. The "first", the "second", and similar terms used in this application do not indicate any order, quantity or significance, but are used to only distinguish different components. Similarly, "include", "comprise", or similar terms mean that elements or items appearing before the term cover elements or items listed after the term and their equivalents, but do not exclude other elements or items. A similar term such as "connect" or "connection" is not limited to a physical or mechanical connection, but may include an electrical connection, whether direct or indirect. "Up", "down", "left", "right", and the like are merely used for indicating relative positional relationships. After absolute positions of described objects change, relative positional relationships may change correspondingly.

When real-time target detection is performed on a video, in the related technology, a method of executing a target detection algorithm may be performed on image frames in a video frame in a frame-by-frame manner. For example, an algorithm such as an R-CNN ("Region Based Convolutional Neural Networks") may be used for performing target detection on each frame of the video. Moreover, continuity of a time sequence feature of the video may further be considered by extracting optical flow information between every two frames, features of the same object in different frames are fused by using the optical flow, and the target detection is then performed.

It is time-consuming to perform target detection on each frame in a video. Using an NVIDIA GTX1080 computing platform as an example, a speed of a commonly used algorithm YOLO, of which the speed is relatively fast in target detection, is about 40 frames per second. Moreover, if optical flow information is used for determining a time sequence feature of the video, the optical flow information in the video needs to be extracted in advance, which also requires considerable computing resources. Further, in some related technologies, because after an entire video is obtained, the target detection of the frame needs to be implemented by fusing features of previous and subsequent frames of each frame, video target detection is performed offline.

To improve a speed of performing target detection on a video to meet the requirements on real-time performance of the video target detection, a new method for performing target detection on a video is provided in this application.

FIG. 1 is a diagram of an exemplary scenario of an image processing system according to this application. As shown in FIG. 1, the image processing system 100 may include a user terminal 110, a network 120, a server 130, and a database 140.

The user terminal 110 may be, for example, a computer 110-1 or a mobile phone 110-2 shown in FIG. 1. It is to be understood that the user terminal may be any other type of electronic device capable of performing data processing, which may include, but is not limited to a desktop computer, a notebook computer, a tablet computer, a smartphone, a smart household device, a wearable device, an in-vehicle electronic device, a monitoring device, and the like. The user terminal may also be any equipment provided with an electronic device, for example, a vehicle, a robot, and the like.

Figure 8:
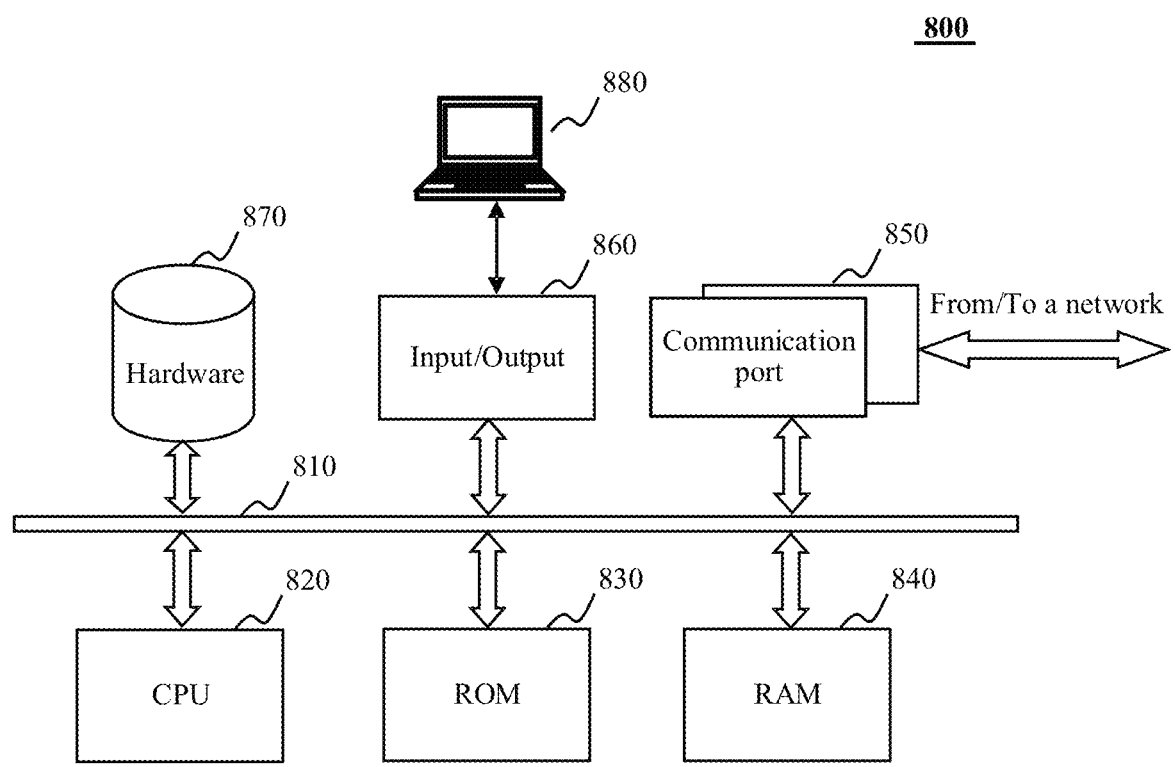
FIG. 8 is an architecture of a computing device according to an embodiment of this application.

The user terminal 110 may install a computing device shown in FIG. 8. In this case, the user terminal provided in this application can be used for receiving a to-be-processed video, and the method provided in this application is used for performing target detection on the video. For example, the user terminal may acquire the to-be-processed video by using an image acquisition device (for example, a camera, a video camera, and the like) disposed on the user terminal. In another example, the user terminal may further receive the to-be-processed video from an independently disposed image capture device. In another example, the user terminal may further receive the to-be-processed video from a server through a network, for example, receive a video stream transmitted from the server.

In some embodiments, a processing unit of the user terminal may be used for processing a video frame. In some implementations, the user terminal may perform video target detection by using a built-in application program of the user terminal. In some other implementations, the user terminal may perform the video target detection by invoking an application program stored outside the user terminal.

In some other embodiments, a computing device shown in FIG. 8 may be installed on the server 130. In this case, the user terminal transmits the received to-be-processed video to the server 130 through the network 120, and the server 130 performs the video target detection. In some implementations, the server 130 may perform the video target detection by using a built-in application program of the server. In some other implementations, the server 130 may perform the video target detection by invoking an application program stored outside the server.

The network 120 may be a single network, or a combination of at least two different networks. For example, the network 120 may include, but is not limited to, one or a combination of a local area network, a wide area network, a public network, and a dedicated network.

The server 130 may be an independent server, or a server group, and all the servers in the group are connected through a wired or wireless network. A server group may be centralized, for example, a data center, or may be distributed. The server 130 may be local or remote.

The database 140 may generally refer to a device with a storage function. The database 140 is mainly configured to store various data used, generated, and outputted from work of the user terminal 110 and the server 130. The database 140 may be local or remote. The database 140 may include various memories such as a random access memory (RAM) and a read-only memory (ROM). The foregoing storage device only lists some examples, and the storage device that may be used in the system are not limited hereto.

The database 140 may be connected or communicated with the server 130 or a part thereof through the network 120, or directly connected or communicated with the server 130, or a combination of the above two methods.

The system provided in FIG. 1 can be used for detecting a target in each frame of a video. The following describes a principle of this application by using a first frame and a second frame in a video as an example. The "first frame" and the "second frame" herein do not specifically refer to the first image frame and the second image frame that appear in the video, but may represent any image frame in the video. The image processing method described below can be used for detecting a target in the video in a frame skip method.

A flow of the image processing method provided in this application is described in detail below.

Figure 2:
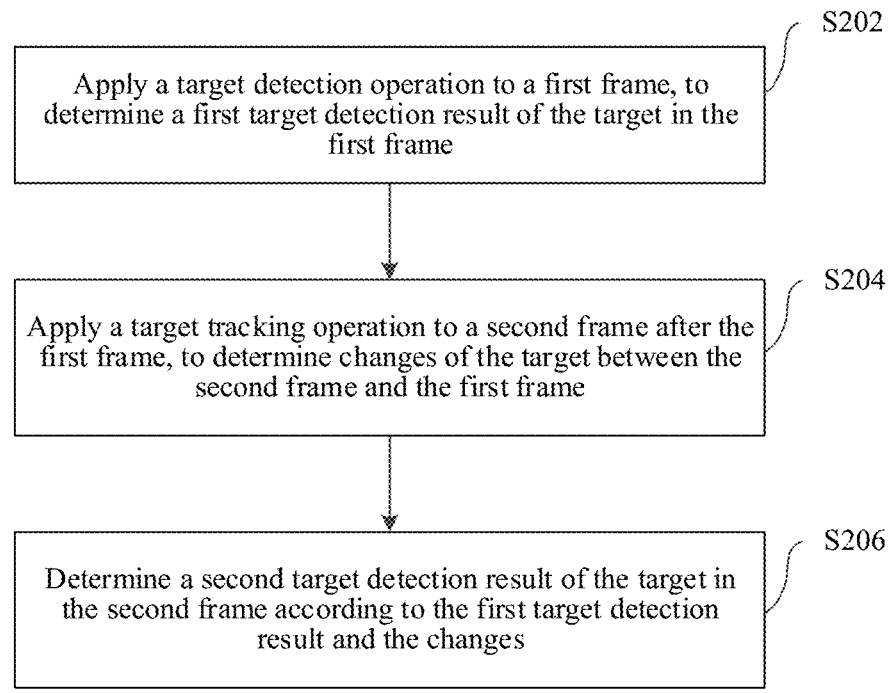
FIG. 2 is a schematic flowchart of a method for detecting a target in a video according to an embodiment of this application.

FIG. 2 is a schematic flowchart of a method for detecting a target in a video according to an embodiment of this application. The method shown in FIG. 2 may be performed by a computing device shown in FIG. 8. The video may be a real-time video or an offline video.

Step S202. Apply a target detection operation to a first frame, to determine a first target detection result of the target in the first frame. The target herein may be a predefined target, for example, may be a person, an animal, a plant or any other object in an image. A user may predefine a type of a to-be-detected target in the video. The target detection refers to identifying a target in an image by using a predefined algorithm.

In some embodiments, the target detection operation may be performed by using any one of image target detection algorithms such as an R-CNN, a Fast R-CNN, a Faster R-CNN, a YOLO, or an SSD. For example, the first frame may be inputted to the target detection algorithm, and a result outputted by the target detection algorithm is used as a detection result of the first frame. For example, the target detection algorithm may output a target box indicating at least one preset target included in the first frame. The target box herein may be any graphics surrounding the target, for example, an outline graphics or another regular or irregular graphics of the target, for example, a triangle, a rectangle, and the like.

In some embodiments, the target detection may be performed on the first frame according to a detection result of an image frame before the first frame. For example, the target tracking operation may be performed on the first frame according to a detection result of a frame before (or, any frame before the first frame) of the first frame, to determine a target tracking result for the first frame. Subsequently, the target detection algorithm may be performed on the first frame according to the target tracking result of the first frame and image information in the first frame, to determine the detection result of the first frame. In this application, a process of performing the target detection algorithm by using the target tracking result of the first frame is described in detail in FIG. 4A latter, and details are not described herein again.

Step S204. Apply a target tracking operation to a second frame after the first frame, to determine changes of the target between the first frame and the second frame. Target tracking refers to determining a target detection result of the target in a latter frame based on a target detection result of the target in a former frame according to the changes of the target between the two frames.

The second frame may be any frame after the first frame in the video. For example, the second frame may be a next image frame adjacent to the first frame in the video. In another example, the second frame may also be an image frame that is not adjacent to the first frame and located after the first frame in the video.

In some embodiments, the target tracking operation may be implemented by using a generative model. In a generative target tracking algorithm, the target may be modeled in a current frame, and then a most similar region to the model is looked up in a next frame to predict a position of the target in the next frame according to the most similar determined region. For example, the generative target tracking algorithm may be based on methods such as a Kalman filter, a particle filter, and mean-shift.

In some embodiments, the target tracking operation may be implemented by using a discriminative model. In a discriminative target tracking algorithm, the target tracking may be regarded as a binary classification matter. The target and background information may be simultaneously extracted to train a classifier. The target is separated from an image sequence background. An optimal target region can be found in the next frame by using the trained classifier.

In some embodiments, a neural network may be trained to process image information of a video frame, to generate an output map having the same size as the video frame. Appropriate samples are used for training, so that each pixel in the output map outputted by the trained neural network can indicate changes in a size and a shape feature of the target to which the pixel belongs and between the first frame and the second frame. Therefore, a position of the target at a next frame may be predicted based on the known target detection result by using a pixel-level object flow prediction method.

In some embodiments, an output of the neural network may include at least two output sets, and each output set includes at least one output map having the same size as the second frame and is used for indicating the changes of the target, in a preset size interval, between the first frame and the second frame. In this case, step S204 may include selecting a corresponding output set according to a size of the target, to determine the changes of the target between the first frame and the second frame.

For example, the changes may refer to changes in the position and shape feature of the target corresponding to the first target detection result in the first frame. For example, using an example in which the target corresponding to the first target detection result is a rectangular target box, shape features of the target box may refer to a length and a width of the rectangular target box. A position change of the target may be represented by a position change in a feature point on the target. For example, a feature point at an upper left corner of the rectangular target box may be used as the feature point of the target, and a position change in the feature point at the upper left corner is used for representing the position change of the target.

Figure 3:
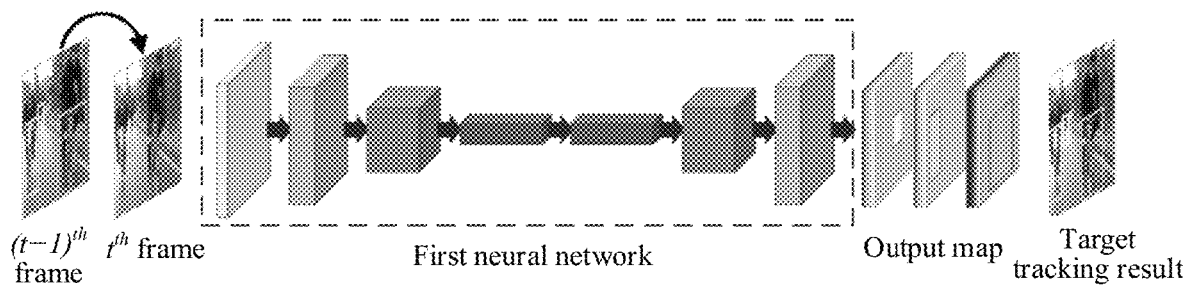
FIG. 3 is an exemplary example of a pixel-level target tracking algorithm according to an embodiment of this application.

FIG. 3 is an exemplary example of a pixel-level target tracking algorithm according to an embodiment of this application.

The following describes a principle of the target tracking algorithm of this application by using a $(t-1)^{th}$ frame and a $t^{th}$ frame in a video as an example. t is an integer greater than 1. However, a person skilled in the art may understand that, actually, any frame before the $t^{th}$ frame in the video may be selected according to an actual situation, and a target detection result of the selected frame is used for predicting a detection result in the $t^{th}$ frame.

As shown in FIG. 3, the $(t-1)^{th}$ frame and the $t^{th}$ frame may be inputted to a first neural network. In some embodiments, a pixel-level segmented network structure (for example, a DeepLab series network, an FCN network, and the like) may be used for implementing the first neural network. For example, the first neural network may include the pixel-level segmented network structure, to obtain pixel-level semantic information of the $(t-1)^{th}$ frame and the $t^{th}$ frame.

The $(t-1)^{th}$ frame and the $t^{th}$ frame are two images with a size of H*W. H and W may be sizes in a unit of a quantity of pixels. In some embodiments, the $(t-1)^{th}$ frame and the $t^{th}$ frame have the same quantity of channels. For example, when the $(t-1)^{th}$ frame and the $t^{th}$ frame are color images, the $(t-1)^{th}$ frame and the $t^{th}$ frame both have three channels R, G, and B. The $(t-1)^{th}$ frame and the $t^{th}$ frame are combined, for example, concatenation in a channel dimension may form an input tensor of a size of H*W*6. A person skilled in the art may understand that the $(t-1)^{th}$ frame and the $t^{th}$ frame may also be combined in other manners.

The first neural network is configured to process the input tensor, and pixel-level semantic segmentation can be performed on the input tensor. The first neural network is appropriately configured, so that the first neural network outputs at least one output map having the same size as the image size of the $(t-1)^{th}$ frame and the $t^{th}$ frame. For example, the output map of the first neural network may be obtained by performing at least once convolution on a result outputted by the pixel-level segmented network. When the first neural network is configured to output at least two output maps, corresponding output maps may be obtained by respectively performing at least once convolution on results outputted by the pixel-level segmented network.

Through appropriate training, a pixel value of each pixel corresponding to the target in the $(t-1)^{th}$ frame in the output map of the first neural network may indicate a change in a position or a shape feature of the target to which the pixel belongs and between the $(t-1)^{th}$ frame and the $t^{th}$ frame.

In some embodiments, when the detection result in the $(t-1)^{th}$ frame is represented as a rectangular target box, the first neural network may be configured to output four output maps. Pixel values of pixels in the four output maps may be used for representing a change in a parameter x in a horizontal direction and a change in a parameter y in a vertical direction of the target box in the $(t-1)^{th}$ frame, a change in a width w of the rectangular box, and a change in a height h of the rectangular box. In an implementation, changes of the four parameters x, y, w, and h between the $(t-1)^{th}$ frame and the $t^{th}$ frame may be expressed as the following formulas:

$$\Delta x = x_t - x_{t-1} \quad (1)$$

$$\Delta y = y_t - y_{t-1} \quad (2)$$

$$\Delta w = \log\left(\frac{w_t}{w_{t-1}}\right) \quad (3)$$

$$\Delta h = \log\left(\frac{h_t}{h_{t-1}}\right) \quad (4)$$

A person skilled in the art may understand that representation manners of the changes of the four parameters x, y, w, and h between the $(t-1)^{th}$ frame and the $t^{th}$ frame are not limited hereto. For example, $\Delta w$ may also be expressed as $$\frac{w_t}{w_{t-1}},$$

and $\Delta h$ may also be expressed as $$\frac{h_t}{h_{t-1}}.$$

A person skilled in the art may determine the representation manners of $\Delta x$, $\Delta y$, $\Delta w$, and $\Delta h$ according to an actual situation.

Therefore, for any target box in the $(t-1)^{th}$ frame, an average pixel value corresponding to the pixels covered by the target box in the output map may be used for representing the change in the position or the shape feature of the target box.

It is to be understood that when the target in the $(t-1)^{th}$ frame is represented as a target box with another shape, the position and the shape feature used for representing the target box may be determined according to an actual situation, and a quantity of output maps of a target tracking network are determined according to the determined position and the shape feature of the target box. Each output map represents a change in one of the position and the shape feature of the target box.

In another embodiment, at least one output map outputted by the first neural network may be divided into at least two output sets, and each output set includes at least one output map and is used for indicating the change of the target, in a preset size interval, between the first frame and the second frame. The output map in the each output set represents the change in the position or the shape feature of the target in the preset size interval.

In an implementation, when the detection result in the $(t-1)^{th}$ frame is represented as a rectangular target box, the first neural network may output three output sets, and each output set includes four output maps. The output sets respectively represent tracking a large-sized target, a medium-sized target, and a small-sized target. A size interval of the target box may be determined according to a preset first size threshold and second size threshold. For example, a target of which the size is greater than (equal to) the first size threshold may be determined as the large-sized target, a target of which the size is less than (equal to) the second size threshold may be determined as the small-sized target, and a target of which the size is between the first size threshold and the second size threshold may be determined as the medium-sized target. The target boxes included in the image frame may be divided into a large-sized target box, a medium-sized target box, and a small-sized target box according to predefined size intervals. The first neural network is trained by using an appropriate training set, and the each output set has a better tracking effect on a target box of a corresponding size. It is to be understood that a person skilled in the art may determine a division of the size interval and a quantity of the size intervals according to an actual situation.

In addition, the four output maps included in the each output set may be respectively used for representing a change in a horizontal direction x and a change in a vertical direction y of the target box in the $(t-1)^{th}$ frame, a change in a width w of the rectangular box, and a change in a height h of the rectangular box.

Referring back to FIG. 2. Step S206. Determine a second target detection result of the target in the second frame according to the first target detection result and the changes of the target between the first frame and the second frame.

In some embodiments, the first target detection result in the first frame may be adjusted according to the changes of the target between the first frame and the second frame, to determine the second target detection result for the second frame. For example, parameters of the position and the shape feature of the target in the second frame may be determined according to formulas (1) to (4).

As described above, a target detection result of the first frame (for example, the $(t-1)^{th}$ frame) may be determined by performing step S202, that is, $x_{t-1}$, $y_{t-1}$, $w_{t-1}$, and $h_{t-1}$. The changes of the target between the first frame and the second frame may be determined by performing step S204, that is, $\Delta x$, $\Delta y$, $\Delta w$, and $\Delta h$. When $x_{t-1}$, $y_{t-1}$, $w_{t-1}$, $h_{t-1}$, $\Delta x$, $\Delta y$, $\Delta w$, and $\Delta h$ are all known, $x_t$, $y_t$, $w_t$, and $h_t$ may be obtained by using the formulas (1) to (4). Still referring to FIG. 3, a target tracking result of the $t^{th}$ frame may be determined according to the output map of the first neural network. Such a target tracking result may be determined as a detection result corresponding to the target in the $t^{th}$ frame.

A person skilled in the art may understand that the target is not limited to a form of a rectangular target box. Actually, a target box of any shape may be used for representing the target corresponding to the detection result in the image frame. For example, the target corresponding to the detection result in the image frame may be represented by using a geometric shape such as a triangle and a circle, a contour line of the target or a shape formed by any curve.

By using the foregoing method, time-consuming target detection may be performed on a part of the image frames in the video, and faster target tracking is performed on another part of the image frames, thereby accelerating a calculation speed of monitoring the target in the video. Therefore, it is to be understood that the second target detection result of the target in the second frame may be used for further predicting a position of the target in a third frame after the second frame. For example, the target tracking operation may be applied to the third frame after the second frame, to determine changes of the target between the second frame and the third frame. Subsequently, a third target detection result of the target in the third frame may be determined according to the second target detection result and the changes of the target between the second frame and the third frame.

According to the method for detecting a target in a video provided in this application, a target detection algorithm is applied to only a part of the image frames in the video, and a target tracking algorithm with a less amount of calculation is applied to another part of the image frames, so that the calculation speed of detecting the target in the video can be improved, thereby meeting higher requirements on real-time performance. In addition, performing pixel-level segmentation on the image frame can better predict, in a subsequent image frame, a position of an object to which each pixel point belongs, to obtain a final target object tracking result. In addition, providing target instance-aware guidance information in a process of target detection can obtain a better target detection result.

The following describes methods for training the first neural network and a second neural network used in this application. A preset training set may be used for training the first neural network and the second neural network. The first neural network and the second neural network may both include an input layer, an intermediate layer, and an output layer. The intermediate layer may include at least one convolutional layer.

In some embodiments, a first training set required may be determined to train the first neural network, where the first training set includes a first training video, the first training video includes a first training frame and a second training frame after the first training frame, and the first training frame and the second training frame include a to-be-detected training target. A skilled person can use, for example, manual annotation, or use a general-purpose target detection algorithm to determine a real detection result in the first training frame and the second training frame, to determine real changes of the training target between the first training frame and the second training frame. The real changes of the training target between the first training frame and the second training frame refer to changes of the training target in a corresponding position, size, and color in the first training frame relative to a position, size, and color of the training target in the second training frame. A person skilled in the art may understand that factors for measuring the real changes are not limited to the position, the size, and the color, but may further include other limiting conditions such as a rotation angle, and details are not described herein again.

By applying the target detection operation to the first training frame, a first training detection result of the training target in the first training frame may be determined. By applying the target tracking operation to the second training frame after the first training frame in the first training video by using the first neural network, a first change of the training target between the first training frame and the second training frame may be determined. By adjusting a parameter of the first neural network, a difference between the first change and the real change may be minimized. In some embodiments, a regular term L1 or a regular term L2 may be used for representing the difference between the first change and the real change.

In some embodiments, the first neural network may further be trained according to an output result of the intermediate layer of the first neural network. Such an output result of the intermediate layer may be referred to as a side-branch tracking predictor. For example, a second change of the training target between the first training frame and the second training frame may be determined according to an output of at least one intermediate layer of the first neural network, and a difference between the second change and the real change is determined. The parameter of the first neural network may be adjusted to minimize the difference between the first change and the real change and the difference between the second change and the real change. Physical meaning of the second change and physical meaning of the first change are the same, and can both represent a target tracking result of the training target. A difference is that the first change includes processing results of all convolutional layers in the first neural network, while the second change includes only the processing results of some convolutional layers in the first neural network. The parameter of the first neural network is adjusted according to the difference between the second change and the real change, so that the difference between the second change and the real change is minimum, and the first neural network may be further trained. In some embodiments, the regular term L1 or the regular term L2 may be used for representing the difference between the first change and the real change. When considering the second change, a feedback supervision result in a training process is not only applied to an output of an end of the network, but also applied to the convolutional layer in the middle of the network. Therefore, a training effect is better, and network prediction accuracy is higher.

Similar to the first change, the second change may also include at least two output sets for tracking targets of different sizes.

The preset training set may be used for training the second neural network. For example, a position and a size of a real target in the first training frame may be determined. A first training target detection result for the first training frame may be determined according to an output of the second neural network by using the target detection method provided in FIG. 4A in this application. The real target in the first training frame may be determined in a manual annotation method. A parameter of the second neural network may be adjusted according to a difference between the first target detection result and the real target in the first training frame, to minimize the difference between the first target detection result and the real target in the first training frame. In some embodiments, the regular term L1 or the regular term L2 may represent the difference between the first target detection result and the real target in the first training frame.

Figure 4A:
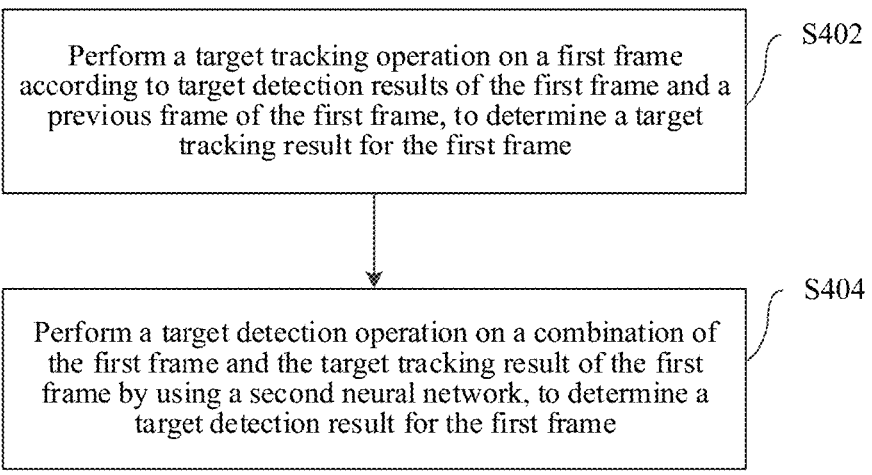
FIG. 4A is a schematic flowchart of a method for performing target detection on a first frame in a video based on a target tracking result according to an embodiment of this application.

FIG. 4A is a schematic flowchart of a method for performing target detection on a first frame in a video based on a target tracking result according to an embodiment of this application.

Step S402. Perform a target tracking operation on a first frame according to target detection results of the first frame and a frame before the first frame, to determine a target tracking result for the first frame. For example, the first frame and the frame before the first frame may be processed by using the target tracking network explained in FIG. 2 and FIG. 3, to obtain the target tracking result for the first frame. The target tracking result obtained herein may be used as target instance-aware guidance information of the target detection algorithm of the first frame.

Step S404. Perform a target detection operation on a combination of the first frame and the target tracking result of the first frame, to determine a target detection result for the first frame. For example, the target detection operation may be performed on a combination of the first frame and the target tracking result of the first frame by using the second neural network. As described above, a person skilled in the art may implement the combination of the first frame and the target tracking result of the first frame in any method, for example, concatenation in a channel dimension.

In some embodiments, according to the target tracking result of the first frame, pixels in the first frame other than the above target tracking result may be set to zero, to obtain a target tracking image for the first frame. The target tracking image and an image of the first frame are combined in the channel dimension, to form a detection input tensor of a size of H*W*6. The target detection algorithm may be used for processing the detection input tensor, and the target detection result of the first frame is obtained.

Figure 4B:
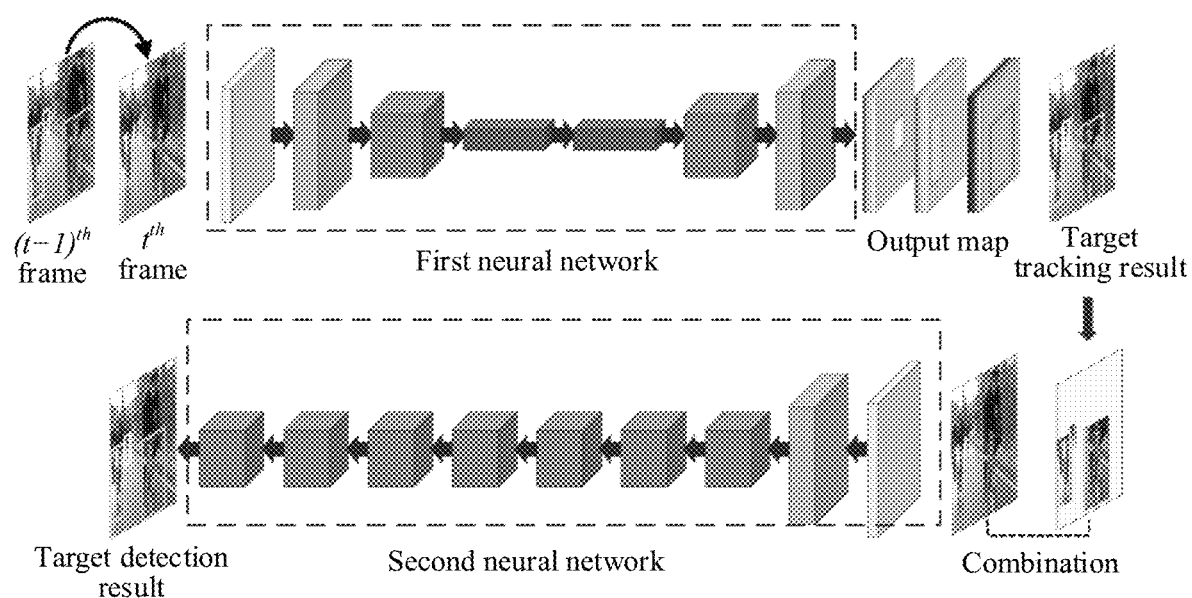
FIG. 4B is a schematic diagram of a target detection process according to an embodiment of this application.

FIG. 4B is a schematic diagram of a target detection operation based on a target tracking result according to an embodiment of this application. An upper half part of FIG. 4B is a target tracking process according to a principle of this application, and a target tracking result of a $t^{th}$ frame can be obtained by using the target tracking process. Subsequently, the target tracking result of the $t^{th}$ frame and an image of the $t^{th}$ frame are combined in the channel dimension, the target detection algorithm is used to process an input tensor of the combination of the target tracking result of the $t^{th}$ frame and the image of the $t^{th}$ frame, and a final target tracking result of the $t^{th}$ frame is obtained.

A lower half part of FIG. 4B is a process of performing target detection on the $t^{th}$ frame by using the target tracking result of the $t^{th}$ frame. As shown in FIG. 4B, the target tracking image of the $t^{th}$ frame obtained by using a target tracking algorithm and the image of the $t^{th}$ frame are combined in the channel dimension, and a trained second neural network is inputted, to obtain a target detection result of the $t^{th}$ frame.

Figure 5:
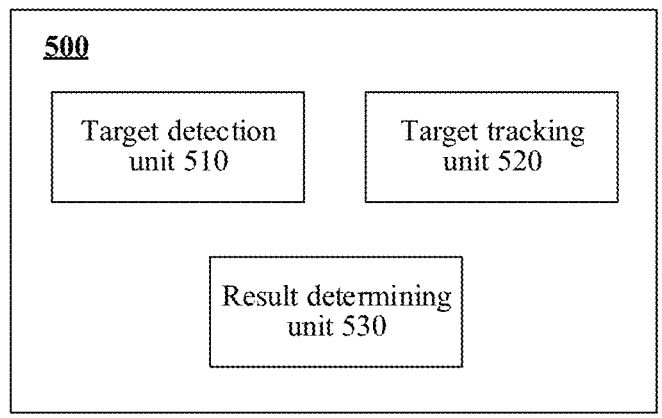
FIG. 5 is a schematic block diagram of an apparatus for detecting a target in a video according to an embodiment of this application.

FIG. 5 is a schematic block diagram of an apparatus for detecting a target in a video according to an embodiment of this application. As shown in FIG. 5, an apparatus 500 may include a target detection unit 510, a target tracking unit 520, and a result determining unit 530.

The target detection unit 510 may be configured to apply a target detection operation to a first frame, to determine a first target detection result of the target in the first frame. In some embodiments, the target detection operation may be performed by using any one of image target detection algorithms such as an R-CNN, a Fast R-CNN, a Faster R-CNN, a YOLO, or an SSD. For example, the first frame may be inputted to the target detection algorithm, and a result outputted by the target detection algorithm is used as a detection result of the first frame. For example, the target detection algorithm may output a target box indicating at least one preset target included in the first frame.

In some embodiments, the target detection may be performed on the first frame according to a detection result of an image frame before the first frame. For example, the target tracking operation may be performed on the first frame according to a detection result of a frame before (or, any frame before the first frame) of the first frame, to determine a target tracking result for the first frame. Subsequently, the target detection algorithm may be performed on the first frame according to the target tracking result of the first frame and image information in the first frame, to determine the detection result of the first frame.

The target tracking unit 520 may be configured to apply the target tracking operation to a second frame after the first frame in the video, to determine changes of the target between the first frame and the second frame.

In some embodiments, the target tracking operation may be implemented by using a generative model. In a generative target tracking algorithm, the target may be modeled in a current frame, and then the most similar region to the model is looked up in a next frame to predict a position of the target in the next frame according to the most similar determined region. For example, the generative target tracking algorithm may be based on methods such as a Kalman filter, a particle filter, and mean-shift.

In some embodiments, the target tracking operation may be implemented by using a discriminative model. In a discriminative target tracking algorithm, the target tracking may be regarded as a binary classification matter. The target and background information may be simultaneously extracted to train a classifier. The target is separated from an image sequence background. An optimal target region can be found in the next frame by using the trained classifier.

In some embodiments, a neural network may be trained to process image information of a video frame, to generate an output map having the same size as the video frame. Appropriate samples are used for training, so that each pixel in the output map outputted by the trained neural network can indicate changes in a size and a shape feature of the target to which the pixel belongs and between the first frame and the second frame. Therefore, a position of the target at a next frame may be predicted based on the known target detection result by using a pixel-level object flow prediction method.

In some embodiments, an output of the neural network, for example, an output of a first neural network, may include at least two output sets, and each output set includes at least one output map having the same size as the second frame and is used for indicating the changes of the target, in a preset size interval, between the first frame and the second frame. In this case, the target tracking unit 520 may be configured to select a corresponding output set according to a size of the target, to determine the changes of the target between the first frame and the second frame.

For example, the changes may refer to changes in the position and shape feature of the target corresponding to the first target detection result in the first frame. For example, using an example in which the target corresponding to the first target detection result is a rectangular target box, shape features of the target box may refer to a length and a width of the rectangular target box. A position change of the target may be represented by a position change in a feature point on the target. For example, a feature point at an upper left corner of the rectangular target box may be used as the feature point of the target, and a position change in the feature point at the upper left corner is used for representing the position change of the target.

The target tracking may be implemented by using the first neural network provided in this application. The following describes a principle of the target tracking algorithm of this application by using a $(t-1)^{th}$ frame and a $t^{th}$ frame in a video as an example. t is an integer greater than 1.

The $(t-1)^{th}$ frame and the $t^{th}$ frame may be inputted to the first neural network. In some embodiments, a pixel-level segmented network structure (for example, a DeepLab series network, an FCN network, and the like) may be used for implementing the first neural network. For example, the first neural network may include the pixel-level segmented network structure, to obtain pixel-level semantic information of the $(t-1)^{th}$ frame and the $t^{th}$ frame.

The $(t-1)^{th}$ frame and the $t^{th}$ frame are two images with a size of H*W. H and W may be sizes in a unit of a quantity of pixels. In some embodiments, the $(t-1)^{th}$ frame and the $t^{th}$ frame have the same quantity of channels. For example, when the $(t-1)^{th}$ frame and the $t^{th}$ frame are color images, the $(t-1)^{th}$ frame and the $t^{th}$ frame both have three channels R, G, and B. The $(t-1)^{th}$ frame and the $t^{th}$ frame are combined, for example, concatenation in a channel dimension may form an input tensor of a size of H*W*6. A person skilled in the art may understand that the $(t-1)^{th}$ frame and the $t^{th}$ frame may also be combined in other methods.

The first neural network is configured to process the input tensor, and pixel-level semantic segmentation can be performed on the input tensor. The first neural network is appropriately configured, so that the first neural network outputs at least one output map having the same size as the image size of the $(t-1)^{th}$ frame and the $t^{th}$ frame. For example, the output map of the first neural network may be obtained by performing at least once convolution on a result outputted by a pixel-level segmented network. When the first neural network is configured to output at least two output maps, corresponding output maps may be obtained by respectively performing at least once convolution on results outputted by the pixel-level segmented network.

Through appropriate training, a pixel value of each pixel corresponding to the target in the $(t-1)^{th}$ frame in the output map of the first neural network may indicate a change in a position or a shape feature of the target to which the pixel belongs and between the $(t-1)^{th}$ frame and the $t^{th}$ frame.

In some embodiments, when the detection result in the $(t-1)^{th}$ frame is represented as a rectangular target box, the first neural network may be configured to output four output maps. Pixel values of pixels in the four output maps may be used for representing a change in a parameter x in a horizontal direction and a change in a parameter y in a vertical direction of the target box in the $(t-1)^{th}$ frame, a change in a width w of the rectangular box, and a change in a height h of the rectangular box. In an implementation, changes of the four parameters x, y, w, and h between the $(t-1)^{th}$ frame and the $t^{th}$ frame may be expressed as the following formulas:

$$\Delta x = x_t - x_{t-1} \quad (1)$$

$$\Delta y = y_t - y_{t-1} \quad (2)$$

$$\Delta w = \log\left(\frac{w_t}{w_{t-1}}\right) \quad (3)$$

$$\Delta h = \log\left(\frac{h_t}{h_{t-1}}\right) \quad (4)$$

A person skilled in the art may understand that representation manners of the changes of the four parameters x, y, w, and h between the $(t-1)^{th}$ frame and the $t^{th}$ frame are not limited hereto. For example, $\Delta w$ may also be expressed as $$\frac{w_t}{w_{t-1}},$$

and $\Delta h$ may also be expression as $$\frac{h_t}{h_{t-1}}.$$

A person skilled an may determine the representation manners of $\Delta x$, $\Delta y$, $\Delta w$, and $\Delta h$ according to an actual situation.

Therefore, for any target box in the $(t-1)^{th}$ frame, an average value of the pixel values corresponding to the pixels covered by the target box in the output map may be used for representing the change in the position or the shape feature of the target box.

It is to be understood that when the target in the $(t-1)^{th}$ frame is represented as a target box with another shape, the position and the shape feature used for representing the target box may be determined according to an actual situation, and a quantity of output maps of a target tracking network are determined according to the determined position and the shape feature of the target box. Each output map represents a change of one of the position and the shape feature of the target box.

In another embodiment, at least one output map outputted by the first neural network may be divided into at least two output sets, and each output set includes at least one output map and is used for indicating the change of the target, in a preset size interval, between the first frame and the second frame. The output map in the each output set represents the change in the position or the shape feature of the target in the preset size interval.

In an implementation, when the detection result in the $(t-1)^{th}$ frame is represented as a rectangular target box, the first neural network may output three output sets, and each output set includes four output maps. The output sets respectively represent tracking a large-sized target, a medium-sized target, and a small-sized target. The target boxes included in the image frame may be divided into a large-sized target box, a medium-sized target box, and a small-sized target box according to predefined size intervals. The first neural network is trained by using an appropriate training set, and the each output set has a better tracking effect on a target box of a corresponding size.

In addition, the four output maps included in the each output set may be respectively used for representing a change in a horizontal direction x and a change in a vertical direction y of the target box in the $(t-1)^{th}$ frame, a change in a width w of the rectangular box, and a change in a height h of the rectangular box.

A tracking result of the image frame is considered in a process of applying a target detection algorithm to the image frame, so that specific reference information can be provided for the detection process of the target, thereby facilitating improving a target detection result of the image frame.

The result determining unit 530 may be configured to determine a second target detection result of the target in the second frame according to the first target detection result and the changes of the target between the first frame and the second frame.

In some embodiments, the result determining unit 530 may be further configured to adjust the first target detection result in the first frame according to the changes of the target between the first frame and the second frame, to determine the second target detection result for the second frame. For example, parameters of the position and the shape feature of the target in the second frame may be determined according to formulas (1) to (4).

As described above, a target detection result of the first frame (for example, the $(t-1)^{th}$ frame) may be determined by using the target detection unit 510, that is, $x_{t-1}, y_{t-1}, w_{t-1}$, and $h_{t-1}$. The changes of the target between the first frame and the second frame may be determined by using the target tracking unit 520, that is, $\Delta x, \Delta y, \Delta w$, and $\Delta h$. When $x_{t-1}, y_{t-1}, w_{t-1}$, $h_{t-1}, \Delta x, \Delta w$, and $\Delta h$ are all known, $x_t, y_t, w_t$, and $h_t$ may be obtained by using the formulas (1) to (4).

By using the foregoing apparatus, time-consuming target detection may be performed on some of the image frames in the video, and faster target tracking is performed on the other image frames, thereby accelerating a calculation speed of monitoring the target in the video. Therefore, it is to be understood that the second target detection result of the target in the second frame may be used for further predicting a position of the target in a third frame after the second frame. For example, the target tracking unit may be further configured to apply the target tracking operation to the third frame after the second frame, to determine changes of the target between the second frame and the third frame. The result determining unit may be configured to determine a third target detection result of the target in the third frame according to the second target detection result and the changes of the target between the second frame and the third frame.

According to the apparatus for detecting a target in a video provided in this application, the target detection algorithm is applied to only some of the image frames in the video, and a target tracking algorithm with a less amount of calculation is applied to the other image frames, so that a calculation speed of detecting the target in the video can be improved, thereby meeting higher requirements on real-time performance. In addition, by performing pixel-level segmentation on the image frame, a position, of an object to which each pixel point belongs, in a subsequent image frame can be predicted, so as to obtain a final target object tracking result. In addition, by providing target instance-aware guidance information in a process of target detection, a better target detection result can be obtained.

Figure 6:
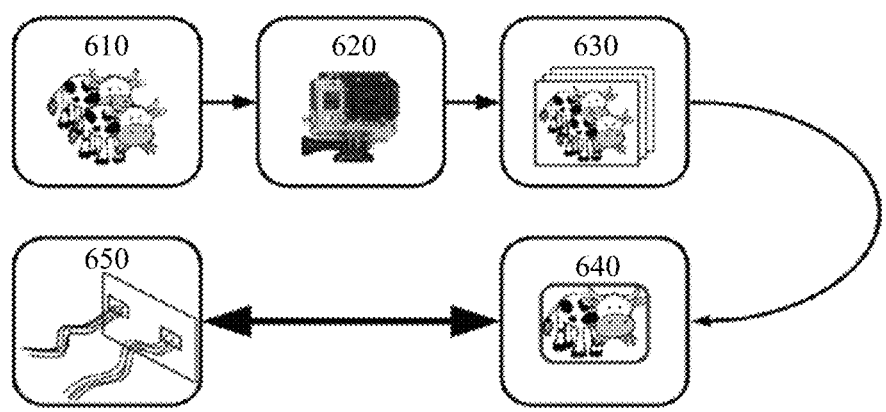
FIG. 6 is a schematic diagram of detecting a target in a video according to an embodiment of this application.

FIG. 6 is a schematic diagram of detecting a target in a video according to an embodiment of this application. As shown in FIG. 6, intelligent video detection of a surveillance camera is used as an example. A video camera 620 may be used for capturing an image 610 including targets, the video camera continuously captures images of an object to form a video. After a video 630 formed by all consecutive frame images is obtained, for example, the video 630 includes two image frames. A detector 640 may be configured to perform target detection on the video 630, to obtain a detection result 650. A specific detection process may be as follows. First, a target detection algorithm is applied to a first frame of image, to determine a first target detection result of the target in the first frame; a target tracking operation is then performed on a second frame of image, to determine changes of the target between a second frame and the first frame; and the second target detection result 650 of the target in the second frame is determined according to the first target detection result and the changes. The detector 640 may be implemented as the apparatus 500 provided in this application. The detection result 650 indicates that two targets included in the image frame are tracked. A person skilled in the art may understand that because time required for target detection of the same frame of image is much longer than tracking time, by performing periodic detection and tracking switching shown in FIG. 6, the required video target detection time can be greatly reduced. Any quantity of targets included in the image frame may be tracked according to an actual situation.

In some embodiments, the detector 640 may further be configured to perform the target detection algorithm on a $(1+n\tau)^{th}$ frame in the video, and perform a target tracking algorithm on the remaining image frames. n is an integer greater than or equal to 0, and z is a predefined positive integer. With such a configuration, the target detection can be performed on the video 630 in a frame skip manner without the need to perform the time-consuming target detection algorithm on each frame. A person skilled in the art may understand that the configuration is merely an example, and a person skilled in the art may select any image frame in the video to perform the target detection algorithm according to an actual situation.

Figure 7:
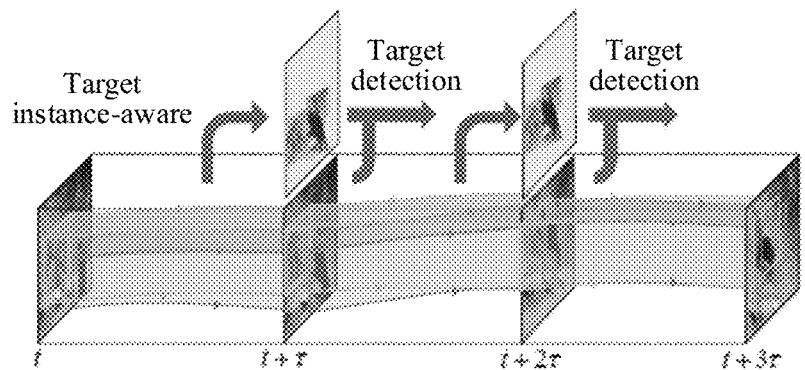
FIG. 7 is a schematic diagram of a process of performing target detection on an image frame in a video according to an embodiment of this application.

FIG. 7 is a schematic diagram of a process of performing target detection on an image frame in a video according to an embodiment of this application. As shown in FIG. 7, every frame, a time-consuming target detection algorithm may be performed on an image frame of a video, to obtain a detection result that can be used for a subsequent target tracking algorithm. The target detection algorithm is performed at regular intervals, so that a result of target detection performed in a frame skip manner using a principle of this application does not deviate from a real result. For other image frames in the video in which the target detection algorithm is not performed, the target tracking algorithm may be used for determining detection results (as arrows shown in FIG. 7) of the target in these frames.

In addition, the method or apparatus according to the embodiments of this application may alternatively be implemented by using an architecture of a computing device shown in FIG. 8. FIG. 8 shows an architecture of a computing device. As shown in FIG. 8, the computing device 800 may include a bus 810, one or at least two CPUs 820, a ROM 830, a RAM 840, a communication port 850 connected to a network, an input/output component 860, a hard disk 870, and the like. A storage device, for example, the ROM 830 or the hard disk 870, in the computing device 800 may store various data or files used in processing and/or communication in the method for detecting a target in a video according to this application and program instructions executed by the CPU. The computing device 800 may further include a user interface 880. Certainly, the architecture shown in FIG. 8 is only exemplary, and when different devices are implemented, one or at least two components in the computing device shown in FIG. 8 may be omitted according to an actual need.

The embodiments of this application may further be implemented as a vehicle. According to the vehicle of the embodiments of this application, an image sensor configured to acquire a video, a memory configured to store instructions, and a processor may be included, where the processor is configured to execute the instructions to perform the method on the acquired video according to the embodiments of this application described with reference to the foregoing accompanying drawings.

The embodiments of this application may further be implemented as a robot. According to the robot of the embodiments of this application, an image sensor configured to acquire a video, a memory configured to store instructions, and a processor may be included, where the processor is configured to execute the instructions to perform the method on the acquired video according to the embodiments of this application described with reference to the foregoing accompanying drawings.

The embodiments of this application may further be implemented as a monitoring device. According to the monitoring device of the embodiments of this application, an image sensor configured to acquire a video, a memory configured to store instructions, and a processor may be included, where the processor is configured to execute the instructions to perform the method on the acquired video according to the embodiments of this application described with reference to the foregoing accompanying drawings.

The embodiments of this application may further be implemented as a computer-readable storage medium. Computer-readable instructions are stored on the computer-readable storage medium according to an embodiment of this application. The computer-readable instructions, when executed by a processor, may perform the method according to the embodiments of this application described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, or a flash memory.

The term unit, and other similar terms such as subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art can understand that, content disclosed in this application may have various variations and improvements. For example, the devices or components described above may be implemented by using hardware, or may be implemented by using software, firmware, or a combination of some of or all of the software, the firmware, and the hardware.

In addition, as shown in this application and the claims, words such as "a/an", "one", and/or "the" do not refer specifically to singular forms and may also include plural forms, unless the context expressly indicates an exception. In general, terms "comprise" and "include" merely indicate including clearly identified steps and elements. The steps and elements do not constitute an exclusive list. A method or a device may also include other steps or elements.

In addition, although this application makes various references to some units in the system according to the embodiments of this application, any quantity of different units may be used and run on a client and/or a server. The units are only illustrative, and different aspects of the system and method may use different units.

In addition, flowcharts are used in this application for illustrating operations performed by the system according to the embodiments of this application. It is to be understood that, the foregoing or following operations are not necessarily strictly performed according to an order. On the contrary, the operations may be performed in a reverse order or simultaneously. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art to which this application belongs. It is further to be understood that, the terms such as those defined in commonly used dictionaries are to be interpreted as having meanings that are consistent with the meanings in the context of the related art, and are not to be interpreted in an idealized or extremely formalized sense, unless expressively so defined herein.

The above is description of this application, and is not to be considered as a limitation to this application. Although several exemplary embodiments of this application are described, a person skilled in the art may easily understand that, many changes can be made to the exemplary embodiments without departing from novel teaching and advantages of this application. Therefore, the changes are intended to be included within the scope of this application as defined by the claims. It is to be understood that, the above is description of this application, and is not to be considered to be limited by the disclosed specific embodiments, and modifications to the disclosed embodiments and other embodiments fall within the scope of the appended claims. This application is subject to the claims and equivalents thereof.

What is claimed is:

1. A method for detecting a target in a video, performed by a computing device, the method comprising:
applying a target detection operation to a first frame in the video, to determine a first target detection result of the target in the first frame;
applying a target tracking operation to a second frame after the first frame in the video, to determine changes of the target between the first frame and the second frame, comprising:
extracting semantic information of a combination of the first frame and the second frame by using a first neural network;
outputting, by the first neural network according to the extracted semantic information, at least two output sets indicating changes of candidate targets belonging to at least two preset size intervals between the first frame and the second frame, wherein different output sets correspond to candidate targets belonging to different preset size intervals; and
selecting, from the at least two output sets, an output set corresponding to a preset size interval that matches a size of the target, to determine the changes of the target corresponding to the first target detection result and between the first frame and the second frame; and
determining a second target detection result of the target in the second frame according to the first target detection result and the changes of the target between the first frame and the second frame.

2. The method according to claim 1, wherein the changes of the target between the first frame and the second frame are changes in a position and a shape feature of the target between the first frame and the second frame.

3. The method according to claim 1, wherein the determining a second target detection result of the target in the second frame according to the first target detection result and the changes of the target between the first frame and the second frame comprises:
adjusting the first target detection result according to the changes of the target between the first frame and the second frame, to determine the second target detection result.

4. The method according to claim 1, further comprising:
applying the target tracking operation to a third frame after the second frame in the video, to determine changes of the target between the second frame and the third frame; and
determining a third target detection result of the target in the third frame according to the second target detection result and the changes of the target between the second frame and the third frame.

5. The method according to claim 1, wherein the applying a target detection operation to a first frame in the video, to determine a first target detection result for the first frame comprises:
performing the target tracking operation based on a frame before the first frame and the first frame, to determine a target tracking result of the target in the first frame; and
performing the target detection operation to a combination of the first frame and the target tracking result, to determine the first target detection result of the target in the first frame.

6. The method according to claim 1, wherein the first neural network is trained by using the following operations:
determining a first training set required to train the first neural network, the first training set comprising a first training video, the first training video comprising a first training frame and a second training frame after the first training frame, and the first training frame and the second training frame comprising a to-be-detected training target;
determining a real change of the training target between the first training frame and the second training frame;
applying the target detection operation to the first training frame, to determine a first training detection result of the training target in the first training frame;
applying the target tracking operation to the second training frame by using the first neural network, to determine a first change of the training target between the first training frame and the second training frame;
determining a difference between the first change and the real change;
determining a second change of the training target between the first training frame and the second training frame according to an output of at least one intermediate layer of the first neural network;
determining a difference between the second change and the real change; and
adjusting a parameter of the first neural network to minimize the difference between the first change and the real change and the difference between the second change and the real change.

7. The method according to claim 1, wherein each output set of the at least two output sets comprises a plurality of output maps, and each of the plurality of output maps has the same dimensions as the second frame.

8. The method according to claim 7, wherein the plurality of output maps in one output set indicate changes of a plurality of parameters of a target box enclosing a candidate target belonging to the corresponding preset size interval.

9. The method according to claim 7, wherein the plurality of output maps in an output set include: an output map indicating a change in a position of a candidate target belonging to the corresponding preset size interval, and an output map indicating a change in a shape feature of the candidate target belonging to the corresponding preset size interval.

10. The method according to claim 9, wherein the output map indicating the change in the position of the candidate target belonging to the corresponding preset size interval comprises: position changes in a plurality of feature points corresponding to the candidate target.

11. The method according to claim 1, further comprising: determining one of the preset size intervals that a candidate target belongs to according to a size of the candidate target and one or more preset size thresholds.

12. An apparatus for detecting a target in a video, comprising at least one memory and at least one processor, the at least one memory storing instructions, and the instructions, when executed by the at least one processor, causing the at least one processor to:
apply a target detection operation to a first frame in the video, to determine a first target detection result of the target in the first frame;
apply a target tracking operation to a second frame after the first frame in the video, to determine changes of the target between the first frame and the second frame, comprising:
extracting semantic information of a combination of the first frame and the second frame by using a first neural network;

outputting, by the first neural network according to the extracted semantic information, at least two output sets indicating changes of candidate targets belonging to at least two preset size intervals between the first frame and the second frame, wherein different output sets correspond to candidate targets belonging to different preset size intervals; and selecting, from the at least two output sets, an output set corresponding to a preset size interval that matches a size of the target, to determine the changes of the target corresponding to the first target detection result and between the first frame and the second frame; and determine a second target detection result of the target in the second frame according to the first target detection result and the changes of the target between the first frame and the second frame.

13. The apparatus according to claim 12, wherein the changes of the target between the first frame and the second frame are changes in a position and a shape feature of the target between the first frame and the second frame.

14. The apparatus according to claim 12, wherein the at least one processor is further configured to adjust the first target detection result according to the changes of the target between the first frame and the second frame, to determine the second target detection result.

15. The apparatus according to claim 12, wherein the at least one processor is further configured to apply the target tracking operation to a third frame after the second frame, to determine changes of the target between the second frame and the third frame; and determine a third target detection result of the target in the third frame according to the second target detection result and the changes of the target between the second frame and the third frame.

16. A non-transitory computer-readable storage medium, storing instructions, the instructions, when executed by at least one processor, causing the at least one processor to perform:

applying a target detection operation to a first frame in the video, to determine a first target detection result of the target in the first frame;

applying a target tracking operation to a second frame after the first frame in the video, to determine changes of the target between the first frame and the second frame, comprising:

extracting semantic information of a combination of the first frame and the second frame by using a first neural network;

outputting, by the first neural network according to the extracted semantic information, at least two output sets indicating changes of candidate targets belonging to at least two preset size intervals between the first frame and the second frame, wherein different output sets correspond to candidate targets belonging to different preset size intervals; and selecting, from the at least two output sets, an output set corresponding to a preset size interval that matches a size of the target, to determine the changes of the target corresponding to the first target detection result and between the first frame and the second frame; and determining a second target detection result of the target in the second frame according to the first target detection result and the changes of the target between the first frame and the second frame.

17. The computer-readable storage medium according to claim 16, wherein the changes of the target between the first frame and the second frame are changes in a position and a shape feature of the target between the first frame and the second frame.

18. The computer-readable storage medium according to claim 16, wherein the determining a second target detection result of the target in the second frame according to the first target detection result and the changes of the target between the first frame and the second frame comprises:

adjusting the first target detection result according to the changes of the target between the first frame and the second frame, to determine the second target detection result.

19. The computer-readable storage medium according to claim 16, wherein the instructions further cause the at least one processor to perform:

applying the target tracking operation to a third frame after the second frame in the video, to determine changes of the target between the second frame and the third frame; and determining a third target detection result of the target in the third frame according to the second target detection result and the changes of the target between the second frame and the third frame.

* * * * *